United States Patent Office 3,362,846
Patented Jan. 9, 1968

3,362,846
METHOD OF COATING PARTICULATE MATERIAL WITH METAL CARBONATES
John M. Lee, Lake Jackson, Tex., and Jay D. Gensler, Edgewood Arsenal, Md., assignors to The Dow Chemical Company, Midland, Mich., a corporation of Delaware
No Drawing. Filed Apr. 6, 1964, Ser. No. 357,793
6 Claims. (Cl. 117—100)

ABSTRACT OF THE DISCLOSURE

A method for preparing metal carbonate coated substrates which comprise: providing a metal carbonate which is more soluble in carbon dioxide saturated aqueous solutions than non-saturated solutions, in a carbon dioxide saturated aqueous solution containing a particulate substrate material, and heating the solution sufficiently to drive off carbon dioxide and precipitate metal carbonate onto the particulate substrate material. The metal carbonate coated substrate material can then be heated at a sufficient temperature to calcine the metal carbonate to the corresponding metal oxide to produce a metal oxide coated substrate material.

---

This invention relates to a novel method for coating a substrate material with an inorganic carbonate.

In accordance with the present invention a carbon dioxide saturated aqueous solution of the desired inorganic carbonate is mixed with particulate substrate material, preferably in aqueous slurry form. After mixing, the aqueous mixture thus formed is heated, preferably with agitation, thereby depositing inorganic carbonate on the substrate material.

Substrate materials, coated in accordance with the present invention, are preferably in the form of particles having a maximum cross-sectional dimension (usually diameter) of from about one micron to about two millimeters.

Temperatures appropriate for initially carbon dioxide saturated aqueous carbonate solution with the substrate are not generally critical, but lower temperatures, in the 0 to 50 degree centigrade range, are to be preferred for this step of the process. Inorganic carbonates, employed in this process, are characterized in that they are more soluble in water which has been saturated with carbon dioxide than in non-saturated water. Carbon dioxide is expelled from the water upon heating and the solubility of the inorganic carbonates decreases thus precipitating out of solution and onto the substrate. Because of the inverse solubility with temperature of carbonates used in this invention in water saturated with carbon dioxide, a lower initial temperature generally permits a higher carbonate concentration. On subsequent heating of the carbonate-substrate slurry, a temperature of at least as high as the saturation temperature of the carbonate solution should be attained. Preferably, the slurry is heated to a temperature above about 70 degrees centigrade and below the boiling point of the slurry. During heating, agitation or stirring is desirable to prevent localized boiling and to assure uniformity of the carbonate coating on the substrate.

Further treatment of the carbonate-coated substrate material may be made to produce particles having an outer surface of active inorganic oxide. The carbonate-coated substrate material is calcined at a temperature above the decomposition temperature of the carbonate, thereby driving off carbon dioxide and leaving particles of active metal oxide-coated substrate. An added advantage of the present process may be obtained by using a heat decomposable substrate material, such as polystyrene, for example. When such substrate materials are employed, the organic substrate decomposes and the resultant calcined product is a hollow sphere of active metal oxide. These have particular utility as refractories or the like.

Suitable metal carbonates for use in the present invention are those which are more soluble in water saturated with carbon dioxide than in non-saturated water. Appropriate metal carbonates are magnesium carbonate ($MgCO_3$) calcium carbonate ($CaCO_3$), manganese carbonate ($MnCO_3$), and the like.

Suitable substrate materials are those which are substantially insoluble in water and which may be readily reduced to the desired particle size. Appropriate substrate materials are zinc oxide (ZnO), aluminum oxide ($Al_2O_3$), silicon dioxide ($SiO_2$), talc, petroleum fluid coke, sericite (a flaky form of $KH_2Al(SiO_4)_3$), polystyrene beads, and the like.

As a measure of the activity of the active metal oxide obtained on calcination, a standard iodine adsorption test may be made. The "iodine number" is the milliliters of N/1 I adsorbed per 100 grams of metal oxide. In the test employed, four grams of MgO, or the equivalent weight of coated substrate particles, is weighed into a dry flask. After adding 170 milliliters of 0.05 N iodine solution in carbon tetrachloride, the mixture is agitated for 30 minutes. After setting for 5 minutes, a 25 milliliter aliquot of the supernatant liquid is withdrawn and added to 50 milliliters of alcoholic potassium iodide solution. The mixture thus formed is titrated with 0.10 N sodium thiosulfate to give a clear solution. After running a blank titration on 25 milliliters of 0.05 N iodine solution in carbon tetrachloride, the iodine number is calculated as follows:

$$\text{Iodine Number} = \frac{\text{ml. N/1 } I_2}{100 \text{ gm. MgO}} =$$
$$(\text{ml. } Na_2S_2O_3 \text{ blank} - \text{ml. } Na_2S_2O_3) \times 10$$

A better understanding of the present invention may be obtained in light of the following examples which are set forth to illustrate, and are not to be construed to limit, the present invention.

Example 1

A magnesium carbonate solution was prepared by saturating 26 liters of deionized water with carbon dioxide and adding 60 grams of active magnesium oxide to the solution in a glass battery jar. Carbon dioxide was continuously added to the water during the addition of the magnesium oxide to assure that the water remained saturated with carbon dioxide. After about 3 hours, the solution was removed from the battery jar and filtered. Titration of an aliquot portion of the solution indicated that 58.7 grams of MgO had dissolved. The solution was maintained at 28 degrees centigrade throughout the process. After filtration the solution was transferred to a clean battery jar equipped with an electric stainless steel stirrer and two 500 watt immersion heaters.

Into a beaker were weighed 100 grams of reagent grade zinc oxide powder and 300 milliliters of water were added thereto. The slurry thus formed was stirred to break up lumps or aggregates.

With stirring, the aqueous zinc oxide slurry was added to the $MgCO_3$ solution. Temperature of the solution was 28 degrees centigrade.

The mixture was then stirred and heated to a temperature of 89 degrees centigrade and then filtered soon thereafter to drive off carbon dioxide and precipitate magnesium carbonate onto the substrate of zinc oxide. After oven drying for 6 hours at 120 degrees centigrade, a filter cake weighing 235 grams was obtained.

Examination of the particles under a polarizing microscope indicated that the substrate particles were covered with birefringent crystal reflections. Oven drying did not change the shape or physical properties of the particles.

The microcomposite particles were then calcined at 410 degrees centigrade for 5 hours. Microscopic examination revealed no change in the shape or birefringent properties of the particles. Electron photomicrographs and diffraction indicated that the outer material on the particles was thin sheets of relatively amorphous and therefore active magnesium oxide (MgO). Adsorption tests indicated an iodine number of 123.9 out of a possible 124.

*Example 2*

In substantially the same manner as set forth in Example 1, composite particles were produced having an outer surface of magnesium carbonate coated on particulate aluminum oxide, silicon dioxide, talc, petroleum fluid coke, sericite, and polystyrene substrate materials, said substrate materials having particle diameters of from about 1 micron to about 2 millimeters. The outer magnesium carbonate layer had substantially the same physical characteristics as described in Example 1.

On calcination, active MgO surfaced particles were produced, with activity substantially as described in Example 1. With the composite employing organic substrate material, however, the calcined product was a hollow sphere of active MgO.

*Example 3*

In substantially the manner described in Examples 1 and 2, composite particles were produced having an outer surface of calcium carbonate or manganese carbonate coated on particulate aluminum oxide, silicon dioxide, talc, petroleum fluid coke, sericite, and polystyrene substrate materials, said substrate materials having particle diameters of from about 1 micron to about 2 millimeters. On calcination, active CaO or MnO surfaced particles were produced. When organic substrate material was employed the calcined product was in the form of a hollow sphere of CaO or MnO.

Various modifications may be made in the present invention without departing from the spirit or scope thereof, and it is to be understood that we limit ourselves only as defined in the appended claims.

We claim:

1. A method which comprises providing a water insoluble, particulate substrate material providing an aqueous solution of metal carbonate saturated with carbon dioxide, mixing said carbonate solution with said substrate material, heating said mixture to a temperature of from about 70 to about 100 degrees centigrade, thereby to coat said particulate substrate material with metal carbonate, and removing metal carbonate-coated substrate particles thus formed from said mixture.

2. A method which comprises providing a water insoluble, particulate substrate material, said particulate substrate material having a particle diameter of from about one micron to about two millimeters, providing an aqueous solution of metal carbonate saturated with carbon dioxide, mixing said carbonate solution with said substrate material, heating said mixture to a temperature of from about 70 to about 100 degrees centigrade, thereby to coat said particulate substrate material with metal carbonate, and removing metal carbonate-coated substrate particles thus formed from said mixture.

3. The method of claim 2 including the step of calcining said metal carbonate-coated substrate particles, thereby to produce particles having metal oxide surfaces.

4. The method of claim 3 wherein the metal carbonate is magnesium carbonate.

5. The method of claim 3 wherein the metal carbonate is calcium carbonate.

6. The method of claim 3 wherein the metal carbonate is manganese carbonate.

References Cited

UNITED STATES PATENTS

| | | | |
|---|---|---|---|
| 464,719 | 12/1891 | Bohm | 117—223 X |
| 2,038,723 | 11/1936 | Dreyfus | 117—42 |
| 2,423,681 | 7/1947 | Butterbaugh et al. | 252—457 X |
| 2,917,415 | 12/1959 | Levi | 117—223 |
| 3,011,867 | 12/1961 | Welsh | 23—295 X |
| 3,147,092 | 9/1964 | DeBaun | 252—417 X |

WILLIAM D. MARTIN, *Primary Examiner.*

E. J. CABIC, *Assistant Examiner.*

UNITED STATES PATENT OFFICE
CERTIFICATE OF CORRECTION

Patent No. 3,362,846

January 9, 1968

John M. Lee et al.

It is hereby certified that error appears in the above numbered patent requiring correction and that the said Letters Patent should read as corrected below.

Column 1, line 14, for "comprise" read -- comprises --; line 40, after "initially" insert -- slurrying the --; column 2, line 22, for "170" read -- 100 --; line 24, for "setting" read -- settling --.

Signed and sealed this 25th day of February 1969.

(SEAL)
Attest:

Edward M. Fletcher, Jr.
Attesting Officer

EDWARD J. BRENNER
Commissioner of Patents